United States Patent
James

(10) Patent No.: US 11,907,609 B2
(45) Date of Patent: Feb. 20, 2024

(54) SYSTEM, DEVICE AND METHOD FOR SELECTING AND MAKING AVAILABLE FOR READING AND REPRODUCING MULTIMEDIA CONTENTS

(71) Applicant: Saronikos Trading and Services, Unipessoal LDA, Madeira (PT)

(72) Inventor: Robert James, Hatfield (GB)

(73) Assignee: Saronikos Trading and Services, Unipessoal LDA, Madeira (PT)

( * ) Notice: Subject to any disclaimer, the term of this patent is extended or adjusted under 35 U.S.C. 154(b) by 112 days.

(21) Appl. No.: 16/956,193

(22) PCT Filed: Dec. 20, 2017

(86) PCT No.: PCT/IB2017/058196
§ 371 (c)(1),
(2) Date: Jun. 19, 2020

(87) PCT Pub. No.: WO2019/122970
PCT Pub. Date: Jun. 27, 2019

(65) Prior Publication Data
US 2020/0334000 A1    Oct. 22, 2020

(51) Int. Cl.
*G06F 3/16* (2006.01)
*G06F 16/638* (2019.01)
*G06F 3/02* (2006.01)

(52) U.S. Cl.
CPC .............. *G06F 3/162* (2013.01); *G06F 3/02* (2013.01); *G06F 3/167* (2013.01); *G06F 16/639* (2019.01)

(58) Field of Classification Search
CPC . G06F 3/162; G06F 3/02; G06F 3/167; G06F 16/639
(Continued)

(56) References Cited

U.S. PATENT DOCUMENTS 9,645,787 B1 * 5/2017 Emigh ................ G06F 3/04842
10,417,184 B1 * 9/2019 Long .................. G06F 16/1794
(Continued)

FOREIGN PATENT DOCUMENTS

JP         2008 293550 A       12/2008

OTHER PUBLICATIONS

International Search Report dated Sep. 9, 2018, issued in PCT Application No. PCT/IB2017/058196, filed Dec. 20, 2017.
(Continued)

*Primary Examiner* — Stephen S Hong
*Assistant Examiner* — Broderick C Anderson
(74) *Attorney, Agent, or Firm* — Workman Nydegger

(57) ABSTRACT

A system, a removable memory device and a method for fruition of multimedia contents are provided, wherein the user can instantly mark a multimedia content as favourite by pressing a button while that content is in reproduction. The archive containing the favourite multimedia contents, along with non-favourite contents, is updated immediately, so that said archive, which is stored in a removable memory device, can be moved from one reproduction apparatus to another. One variant of the invention allows also older-generation reproduction apparatuses, which cannot handle playlists and metadata, to reproduce favourite multimedia contents while excluding those that have not been marked as such.

14 Claims, 2 Drawing Sheets

(58) Field of Classification Search
USPC .......................................................... 707/722
See application file for complete search history.

(56) References Cited

U.S. PATENT DOCUMENTS

| | | | | |
|---|---|---|---|---|
| 2005/0021470 | A1* | 1/2005 | Martin | G06F 16/686 |
| 2005/0160111 | A1* | 7/2005 | Plastina | G06F 16/639 |
| | | | | 707/999.102 |
| 2008/0013916 | A1* | 1/2008 | Sharpe | G11B 27/34 |
| | | | | 386/E5.028 |
| 2008/0250023 | A1* | 10/2008 | Baker | G06Q 20/00 |
| | | | | 707/999.102 |
| 2010/0161633 | A1* | 6/2010 | Nochimowski | G11B 27/105 |
| | | | | 707/758 |
| 2011/0218983 | A1* | 9/2011 | Chaney | G06F 16/686 |
| | | | | 707/705 |
| 2013/0332532 | A1* | 12/2013 | Bernhardsson | H04L 67/02 |
| | | | | 709/204 |
| 2014/0006483 | A1* | 1/2014 | Garmark | H04L 65/1094 |
| | | | | 709/203 |
| 2014/0025636 | A1* | 1/2014 | Branton | G06F 16/164 |
| | | | | 707/755 |
| 2016/0357781 | A1* | 12/2016 | Bastide | G06F 16/164 |

OTHER PUBLICATIONS

Written Opinion dated Sep. 9, 2018, issued in PCT Application No. PCT/IB2017/058196, filed Dec. 20, 2017.

* cited by examiner

SYSTEM, DEVICE AND METHOD FOR SELECTING AND MAKING AVAILABLE FOR READING AND REPRODUCING MULTIMEDIA CONTENTS

BACKGROUND OF THE INVENTION

1. The Field of the Invention

The present invention relates to a system, a removable memory device and a method for fruition of multimedia contents, in particular audio contents (e.g., MP3, WAV or other files), which can be reproduced on several devices such as, for example, portable music players, car entertainment systems, high-fidelity systems, or the like.

2. The Relevant Technology

As is known, the life cycle of apparatuses for reproducing multimedia files (in particular, audio files) integrated into cars or into high-fidelity systems for domestic use is very often longer than ten years, during which they hardly ever undergo any software or hardware updates.

This makes it difficult, or even impossible, to use these apparatuses within a context where large amounts of multimedia files need to be reproduced, which often come from storage units (such as, for example, portable flash or magnetic memories), and which may contain a large number of multimedia contents taking up hundreds of gigabytes of storage space. In fact, many old reproduction apparatuses were designed and made for accessing memories of a few gigabytes in size, without the possibility of using memories of higher capacity and/or the latest file systems that are currently in use, which did not exist yet when such apparatuses were thrown on the market.

Moreover, very often such reproduction apparatuses have low computational power, compared with similar products of later generations. This low computational capability makes it difficult to handle multimedia files as concerns playlist management and indexing, which may require the calculation of hash codes and/or access to a database (e.g., a local database).

Furthermore, older-generation apparatuses do not have any means for easily discerning between the contents that must be reproduced and those that must not be reproduced. What they normally offer is simply the possibility to "skip", via manual inputs, the reproduction of those contents that should not be reproduced.

SUMMARY OF THE INVENTION

The present invention aims at solving these and other problems by providing a system for fruition of multimedia contents, which allows marking the multimedia contents so that even older-generation apparatuses will only reproduce the favourite contents.

Furthermore, the present invention aims at solving these and others problems by providing also a removable memory device and a method for fruition of multimedia contents.

The basic idea of the present invention is to mark the multimedia contents, by means of at least one metadatum, directly in the electronic archive where they are located, so as to distinguish between favourite contents and non-favourite contents. The electronic archive resides in a removable memory device, which can in turn be connected to different apparatuses. By analysing the metadata associated with the files of respective multimedia contents, a reproduction apparatus will be able to automatically select the multimedia contents to be reproduced.

In particular, by using the "filename extension", sometimes also referred to as "filename suffix", as a metadatum, the invention allows even very old apparatuses to discern between the contents to be reproduced and those not to be reproduced. In addition, it becomes also possible to select multimedia contents for reproduction apparatuses that can neither handle playlists nor analyse the associated metadata, which for music files are known as ID3 tags.

Thus, the invention allows reproducing favourite multimedia contents on any type of player equipped with a communication interface for an external memory (e.g., a car entertainment system, a high-fidelity digital reproduction system, a Smart TV, a smartphone, a portable multimedia file reader, or the like).

Further advantageous features of the present invention are set out in the appended claims.

BRIEF DESCRIPTION OF THE DRAWINGS

These features as well as further advantages of the present invention will become more apparent from the following description of an embodiment thereof as shown in the annexed drawings, which are supplied by way of non-limiting example, wherein.

DETAILED DESCRIPTION OF THE PREFERRED EMBODIMENTS

Any reference to "an embodiment" in this description will indicate that a particular configuration, structure or feature is comprised in at least one embodiment of the invention. Therefore, the phrase "in an embodiment" and other similar phrases, which may be present in different parts of this description, will not necessarily be all related to the same embodiment. Furthermore, any particular configuration, structure or feature may be combined in one or more embodiments as deemed appropriate. The references below are therefore used only for simplicity's sake and do not limit the protection scope or extent of the various embodiments.

Figure 1:
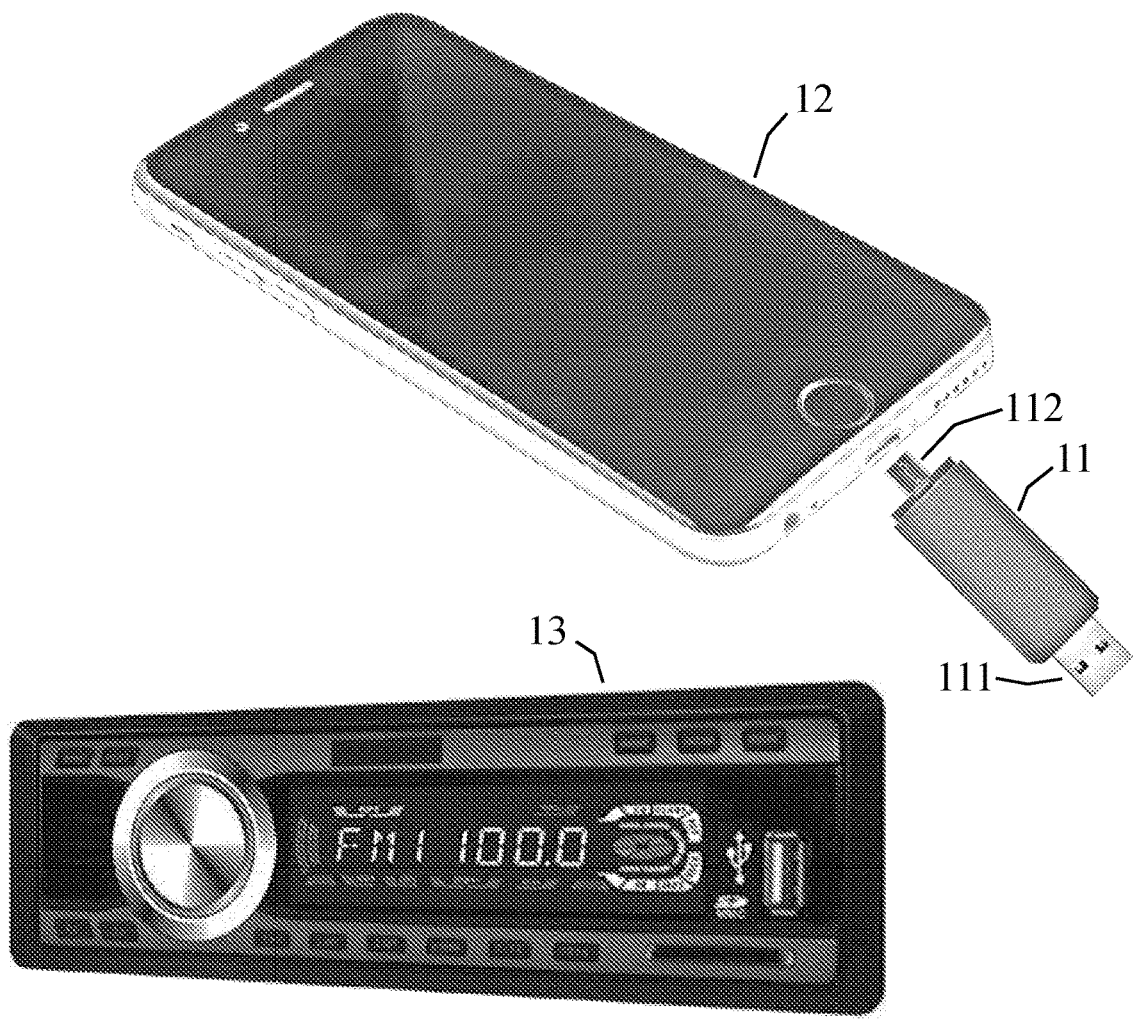
FIG. 1 shows the system according to the invention, which comprises a removable memory device and two independent devices for reproducing multimedia contents according to the prior art.

With reference to FIG. 1, the system for fruition of multimedia contents according to the present invention comprises at least one first reproduction apparatus 12 (e.g., a smartphone, a car entertainment system, a high-fidelity digital reproduction system, a Smart TV, a portable multimedia file reader or other types of apparatus), and a removable memory device 11, which can contain at least a plurality of multimedia contents and can be connected, via a communication interface 111,112, to at least the first reproduction apparatus 12 and preferably also to at least one second reproduction apparatus 13.

The reproduction apparatuses 12,13 and the removable memory device 11 comprise a communication interface 111,112, through which the removable memory device 11 can be connected to the reproduction apparatuses 12,13 to exchange data and numerical streams. Such an interface may be, for example, a USB, SATA, eSATA interface or the like.

The reproduction apparatuses 12,13, and in particular the removable memory device 11, may have several connectors, different in shape, to allow the removable memory device 11 to be connected to different apparatuses. For example, in the case of FIG. 1, the removable memory device 11 has a USB interface with a Type-A connector, which is the connector type typically found on PCs, car radios and fixed apparatuses in general, and a Type B connector, as normally available on smartphones. It will be apparent to a man skilled in the art that the removable memory device 11 may also be equipped with other types of connectors and that such connectors may differ from those shown in FIG. 1 both in number and in configuration, without however departing from the teachings of the present invention.

The first multimedia content reproduction apparatus 12 also comprises processing means, in addition to the above-mentioned communication interface 111,112. Such processing means are in communication with the communication interface 111,112 and are configured for executing the following steps:

a. reproducing or reading, via said communication interface 111,112, at least one of said multimedia contents that are present in the removable memory device 11;

b. generating at least one choice datum defining at least one set of favourite multimedia contents.

The choice datum can be generated on the basis of an indication given by the content user by pressing or touching a button, or by issuing a voice command, or by assigning a numerical value via a keyboard or the like, for the purpose of expressing a favourable or unfavourable opinion about the music content being played by the apparatus; the choice datum may also be automatically generated by the reproduction apparatus 12,13 on the basis of predefined liking criteria related to the characteristics of the multimedia contents. For example, in the case of music tracks, the predefined liking criteria may concern the music genre, the rhythm, the composer's name, the artist's name, the track length, and other characteristics of interest for a music-loving listener.

The processing means of the first reproduction apparatus 12 are also configured for c. writing, on the basis of said choice datum, at least one metadatum directly into said removable memory device 11, wherein said metadatum is associated with at least one of said favourite multimedia contents, and wherein said metadatum defines the associated content as belonging to at least one set of multimedia contents.

The metadatum set by the reproduction apparatus 12 may be an element of the ID3 metadata container associated with the file of the multimedia content being reproduced, or the filename extension, or the like. As will be further explained hereinafter, such a metadatum can be used for marking the multimedia content as either favourite or non-favourite, or more generally with a distinctive character that may take a plurality of values, so as to create a plurality of sets of multimedia contents meeting different choice criteria that may either be set beforehand or expressed by the user of the multimedia content.

Finally, the processing means of the first reproduction apparatus 12 are also configured for d. making available for reading or reproduction, via the communication interface 111,112, all the multimedia contents that are present in the removable memory device 11 or only a set of multimedia contents, defined by a particular value of a metadatum as belonging to the set taken into account.

The above-mentioned ID3 metadata container can be included in the files containing multimedia contents. It allows storing much information in the file of the multimedia content, such as the title of the music track, the composer's name, the artist's name, the title of the album, the track number, the music genre of the track, the track length, and much more, including a level of liking and comments. Therefore, the content user is given a wide range of options for classifying and grouping the contents into sets, so that he/she can request, according to the case, the reproduction of multimedia contents belonging to a chosen set or to a number of sets meeting different criteria. In order to reproduce only multimedia contents belonging to sets meeting certain criteria, the reproduction apparatuses 12,13 comprise selection means configured for selecting said multimedia contents according to at least one metadatum.

By using a metadatum for establishing the order of reproduction of the multimedia contents of one set, playlists can be created without having specific files listing the contents in the preferred order, as is the case of the playlists currently in use. Moreover, the metadata can be interpreted by any player, while the playlists currently in use generally have proprietary formats that can only be interpreted by specific proprietary applications.

Nowadays many players can extract and process metadata contained in multimedia files, but there are also reproduction apparatuses that cannot, whether because they belong to an older generation or because they were designed mainly for different functionalities, such as, for example, vehicular radio receivers. The present invention offers a solution for these cases as well, giving the possibility of defining at least one set of favourite multimedia contents that any reproduction apparatus can automatically select. This can be achieved by using, as a metadatum, the extension of the multimedia file name and by setting the character string representing that extension to values other than the standard ones. The players will not access files having such extensions, and thus they will automatically select the set of contents consisting of files having a recognised extension.

In this case, the set of favourite contents is defined by exclusion. By exclusion, in fact, the choice datum defines also a set of disliked multimedia contents, and the metadatum can also be associated with a multimedia content included in the set of disliked multimedia contents. Therefore, when the filename extension is used as a metadatum, by using different extension strings one can make distinctions between disliked multimedia contents and define a plurality of sets characterised by different reasons of disliking.

Of course, one can define a plurality of sets of disliked contents even if other types of metadata are used, in particular metadata of the ID3 container, as will be apparent to the man skilled in the art. In other words, the processing means may also be configured for writing, on the basis of said at least one choice datum, at least one second metadatum directly into said removable memory device 11, wherein said second metadatum is associated with at least one of said disliked multimedia contents, and wherein said second metadatum defines the associated content as belonging to at least one second set of multimedia contents.

The most advanced reproduction apparatuses made in accordance with the present invention may also offer, by analysing the filename extensions, the possibility of choosing the reproduction of content sets corresponding to different reasons of disliking.

In general, the above-mentioned choice datum that defines at least one set of favourite multimedia contents may take a plurality of values, thus defining a plurality of sets of multimedia contents.

In addition, the reproduction apparatuses made in accordance with the present invention may, for example, select contents corresponding to valid file extensions for the classical music genre. Also, a set of contents may use metadata comprising a sorting metadatum which, within a reproduction sequence, defines the position of the associated multimedia content, or a plurality of metadata may be used as a combination, so as to define a plurality of sets of contents with sorted execution sequences.

Figure 2:
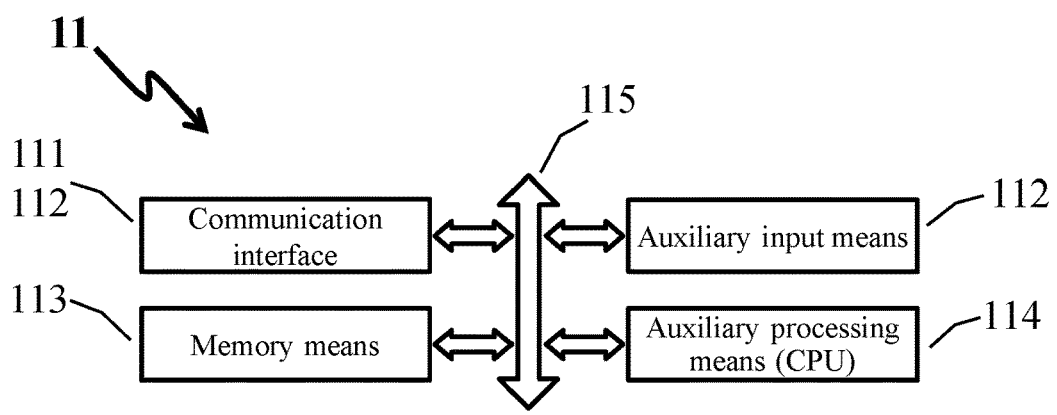
FIG. 2 shows a block diagram representing an architecture of a removable memory device according to the present invention.

Also with reference to FIG. 2, the following will describe a removable memory device 11 for fruition of multimedia contents in accordance with the invention.

The removable memory device 11 essentially comprises the following parts:
- memory means 113 that can contain a plurality of multimedia contents;
- a communication interface 111,112 that, as aforesaid, can be put in communication with at least one reproduction apparatus 12,13;
- (auxiliary) processing means 114 in communication with said memory means 113 and said communication interface 111,112, configured for executing the following steps:
  a. generating at least one choice datum that defines at least one set of favourite multimedia contents, in a way similar to the generation of a choice datum previously described with reference to the reproduction apparatus 12;
  b. writing, on the basis of said choice datum, at least one metadatum directly into the memory means 113 of the same removable memory device 11, wherein said metadatum is associated with at least one of said favourite multimedia contents, and wherein said metadatum defines the associated content as belonging to at least one set of multimedia contents;
  c. making available for reading and reproduction, via said communication interface 111,112, all the multimedia contents that are present in the memory means 113 of the removable memory device 11, or making available only one or more sets of multimedia contents, defined by said metadatum as belonging to the respective sets.

The removable memory device 11 may therefore be a normal and simple removable mass memory, or a device also including processing means of its own, hereafter referred to (for clarity) as auxiliary processing means 114, configured for making available multimedia contents selected on the basis of at least one metadatum. In this case, the selection made by the removable memory device 11 consists of filtering the output files so that only those corresponding to favourite contents will be accessible for reproduction.

Furthermore, the removable memory device 11 may comprise auxiliary input means 112, such as a small push-button, a voice recognition system or the like, for generating at least one feedback datum defining the reaction of a user to the multimedia content being reproduced, wherein said auxiliary processing means 114 are also configured for generating at least one choice datum on the basis of said feedback datum, and for setting the value of at least one metadatum accordingly.

In the removable memory device 11, the communication interface 111, the auxiliary input means 112, the memory means 113 and the auxiliary processing means 114 are interconnected by means of a communication bus 115, which allows for mutual data exchange. As is well known to those skilled in the art, as an alternative to the communication bus 115 said elements of the memory device 11 may also be connected by means of a star architecture.

In light of the above, the method of the present invention comprises the following phases:
a) a choice phase;
b) a writing phase;
c) a multimedia content offering phase.

In the choice phase a) at least one choice datum is generated through the processing means, which defines and represents at least one set of favourite multimedia contents, and preferably classifies the multimedia content being reproduced as belonging to that set. Preferably, the generation of the choice datum occurs directly when a user presses a button, or automatically according to predefined criteria, depending on the characteristics of the multimedia content (music genre, rhythm, composer, artist, etc.). For example, the user may provide for classifying as favourite all classical musical tracks interpreted by a certain artist.

In the writing phase b), at least one metadatum is directly written, on the basis of said choice datum, into memory means 113 of the removable memory device 11, wherein said metadatum is associated with at least one of said favourite multimedia contents, and wherein said metadatum defines the associated content as belonging to at least one set of multimedia contents. In this manner, in the memory means 113 of the removable memory device 11 the multimedia content in execution will be classified in the set of music contents represented by the value of the metadatum just set (for example, in the favourite set, if the choice datum represents preference for the multimedia content in execution).

In the content offering phase c), all the multimedia contents that are present in said memory means 113 of the removable memory device 11, or only one or more sets of multimedia contents, defined by a metadatum as belonging to the respective set, are made available for reading and reproduction through said communication interface 111,112. This means that the updated files relating to the multimedia contents classified by means of the above-described steps are made available for subsequent access and reproduction. For example, if a set of favourite contents has been defined, those multimedia contents which have been classified as favourite can be reproduced by all players without exception, whereas those that have not been classified as favourite can only be reproduced by apparatuses (12,13) that allow users to gain access also to contents classified in sets other than the set of favourite contents or to all contents regardless of their classification.

As aforesaid, a multimedia content can be classified directly by a user. To this end, during the choice phase at least one feedback datum is generated, through auxiliary input means 112 such as a button, a voice recognition system, a keypad or the like, which defines the user's reaction to the multimedia content being reproduced.

Figure 3:
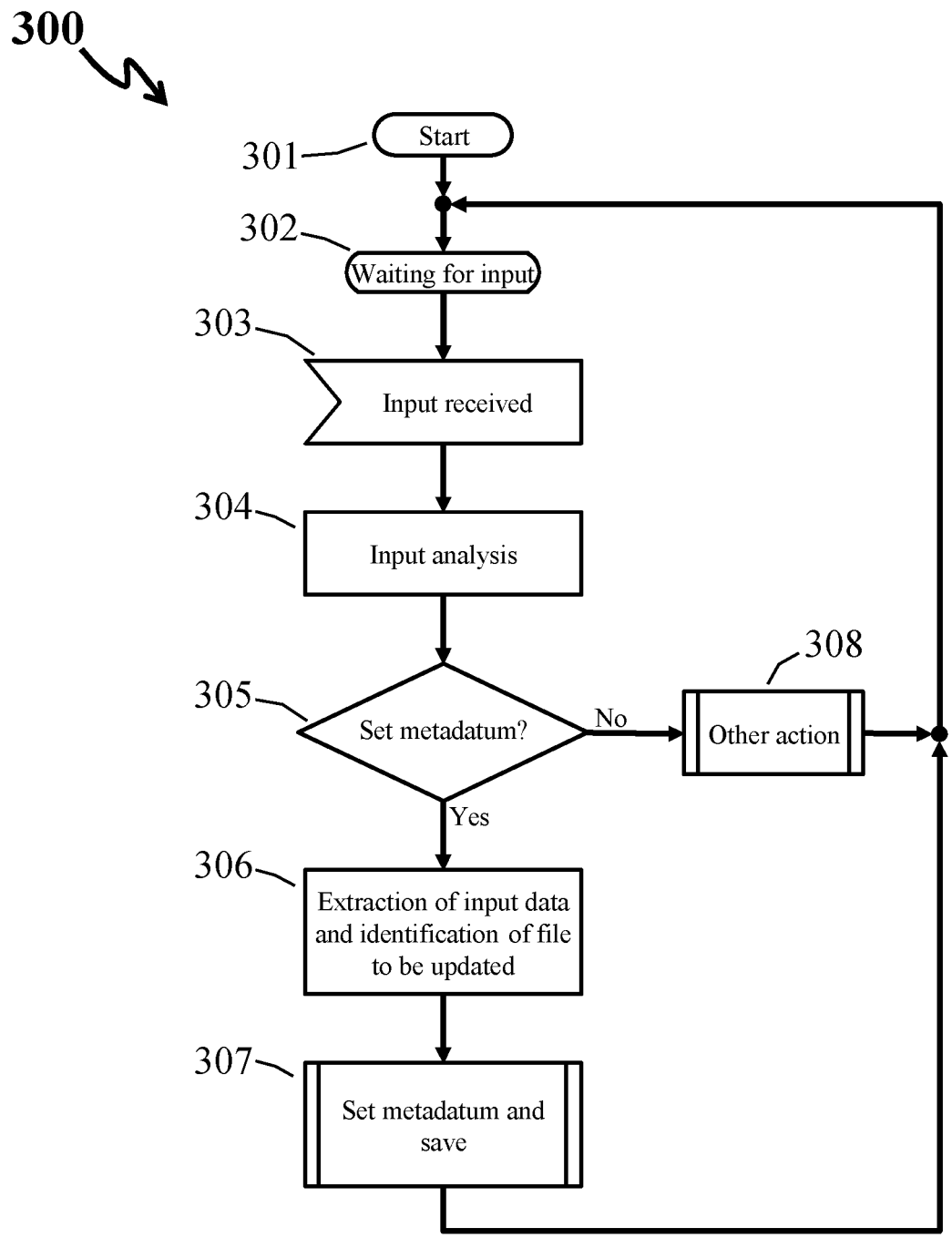
FIG. 3 is a flow chart representing the operation of one possible embodiment of the file marking procedure according to the present invention.

Also with reference to FIG. 3, the following will describe a procedure for setting a metadatum upon receiving a user's input; this procedure is preferably carried out by the auxiliary processing means 114 of the removable memory device 11.

When it is started (step 301), the procedure enters input waiting state 302.

After receiving an input (step 303), step 304 of analysing the input is carried out, wherein it is established whether the received input represents a choice datum for classifying the multimedia content in execution or a datum of another kind.

Step 304 is followed by decision step 305, from which, if the received input does not represent a choice datum for content classification, the procedure jumps to step 308, wherein the operation requested by the input is executed, after which the procedure returns to the input waiting step 302. If, on the contrary, the received input represents a choice datum for classifying a content, the procedure goes on to step 306, wherein the content classification update data are extracted from the received input and the file to be updated is identified.

Step 308 is then carried out, wherein the update of the related metadatum in the associated file is set and the set updates are saved, thus making the file available for further access. Finally, the procedure goes back to the input waiting step 302.

The present invention therefore offers the possibility of instantly including a music track or another kind of multimedia content in the favourites by simply pressing a button.

Advantageously, the set of favourite contents is updated immediately and is readily available for reproduction on many types of players, including older-generation ones, which do not have the functionalities required for using playlists or metadata.

These advantages are obtained by simply storing the files of the multimedia contents in a common removable memory device 11 (typically called "USB key" or "USB pen"), which can be connected to the players of interest.

If the removable memory device 11 also has some processing capability and at least one small button, it may be able itself to receive preference indications from the user, generate the choice data, and update the files accordingly. The removable memory device 11 will thus become autonomous in the management of the multimedia contents stored in its memory means 113.

Moreover, in the case of multimedia content players with some processing capability and offering the possibility of installing a small application for reading and processing metadata, the content user can be given the opportunity to select the contents to be reproduced much like more advanced proprietary players.

Although this description has tackled some of the possible variants of the present invention, it will be apparent to those skilled in the art that other embodiments may also be implemented, wherein some elements may be replaced with other technically equivalent elements. The present invention is not therefore limited to the illustrative examples described herein, since it may be subject to many modifications, improvements or replacements of equivalent parts and elements without departing from the basic inventive idea, as set out in the following claims.

The invention claimed is:

1. A system for fruition of multimedia contents, comprising:
   a first multimedia content reproduction apparatus comprising:
      a communication interface, and
      a processor in communication with said communication interface,
   a removable memory device containing a plurality of multimedia contents and which can be connected, by means of said communication interface, to said first multimedia content reproduction apparatus and to at least one second multimedia content reproduction apparatus,
   wherein said first multimedia content reproduction apparatus further comprises said processor being separate from said removable memory device and being configured for:
      a. reproducing or reading, by means of said communication interface, said plurality of multimedia contents that are present in said removable memory device;
      b. generating at least one choice datum defining at least one set of favorite multimedia contents selected from said plurality of multimedia contents;
      c. writing, on the basis of said at least one choice datum, at least one metadatum directly into said removable memory device, wherein said metadatum is associated with at least one of said favorite multimedia contents, and wherein said metadatum defines the associated content as belonging to at least one set of multimedia contents;
      d. making available for reading and reproduction, by means of said communication interface, all the multimedia contents that are present in said removable memory device or only said at least one set of multimedia contents, defined by said metadatum as belonging to said set.

2. The system for fruition of multimedia contents according to claim 1, wherein said first multimedia content reproduction apparatuses comprise selection means configured for selecting said multimedia contents on the basis of said at least one metadatum.

3. The system for fruition of multimedia contents according to claim 1, wherein said removable memory device comprises selection means configured for selecting said multimedia contents on the basis of said at least one metadatum.

4. The system according to claim 1, wherein said at least one metadatum is an extension of a filename of said at least one multimedia contents, said extension selected such that certain players will not access files having said extension.

5. The system according to claim 1, wherein said at least one choice datum also defines a set of disliked multimedia contents, wherein said processor is also configured for writing, on the basis of said at least one choice datum, at least one second metadatum directly into said removable memory device, wherein said second metadatum is associated with at least one of said disliked multimedia contents, and wherein said second metadatum defines the associated content as belonging to at least one second set of multimedia contents.

6. The system according to claim 1, wherein said at least one choice datum can take a plurality of values, thus defining a plurality of sets of multimedia contents.

7. The system according to claim 1, wherein said at least one metadatum comprises a sorting metadatum which, within a reproduction sequence, defines the position of the associated multimedia content.

8. The system according to claim 1, wherein said removable memory device also comprises an auxiliary processor configured for making available for reading and reproduction the multimedia contents selected according to said at least one metadatum.

9. The system according to claim 8, wherein said removable memory device also comprises:
   auxiliary input means adapted to generate at least one feedback datum defining a user's reaction to the multimedia content being reproduced,
   wherein said auxiliary processor is also configured for generating said at least one choice datum on the basis of said at least one feedback datum and for setting a value of said at least one metadatum.

10. A removable memory device for storing a plurality of multimedia contents, comprising:
memory that can contain a plurality of multimedia contents,
a communication interface that can be put in communication with at least one reproduction apparatus, and
a processor in communication with said memory and said communication interface,
wherein said processor is configured for
  a. generating at least one choice datum defining at least one set of favorite multimedia contents;
  b. writing, on the basis of said at least one choice datum, at least one metadatum directly into said memory of said removable memory device, wherein said metadatum is associated with, and contained in, at least one of said plurality of multimedia contents that is not a favorite multimedia contents, wherein said at least one metadatum is an extension of a filename of said at least one multimedia contents, said extension selected such that certain players will not access files having said extension,
  c. making available for reading and reproduction, via said communication interface, all the multimedia contents that are present in said memory.

11. The removable memory device according to claim 10, comprising:
auxiliary input means adapted to generate at least one feedback datum defining a user's reaction to the multimedia content being reproduced,
wherein said processor is also configured for generating said at least one choice datum on the basis of said at least one feedback datum.

12. A method for fruition of multimedia contents, comprising:
  a) a choice phase, wherein at least one choice datum defining at least one set of favorite multimedia contents is generated through a processor located on a first multimedia content reproduction apparatus;
  b) a writing phase, wherein, on the basis of said at least one choice datum, at least one metadatum is directly written into memory of a removable memory device by the processor located on the first multimedia content reproduction apparatus, the processor being separate from the removable memory device, and wherein said metadatum is associated with, and contained in, at least one of said favorite multimedia contents, and wherein said metadatum defines the associated content as belonging to at least one set of multimedia contents,
  c) a content offering phase, wherein all the multimedia contents that are present in said memory of said removable memory device or only said at least one set of multimedia contents defined by said metadatum as belonging to said set are made available for reading and reproduction by means of communication interface.

13. The method according to claim 12, wherein during the choice phase at least one feedback datum defining a user's reaction to the multimedia content being reproduced is generated through auxiliary input means.

14. A non-transitory computer program product which comprises software code that can be loaded into the memory of an electronic computer, and which comprises portions of software code for executing the phases of the method according to claim 12.

* * * * *